Aug. 30, 1955  F. T. CODER ET AL  2,716,479
TRANSPORTING APPARATUS
Filed Feb. 9, 1954  2 Sheets-Sheet 1
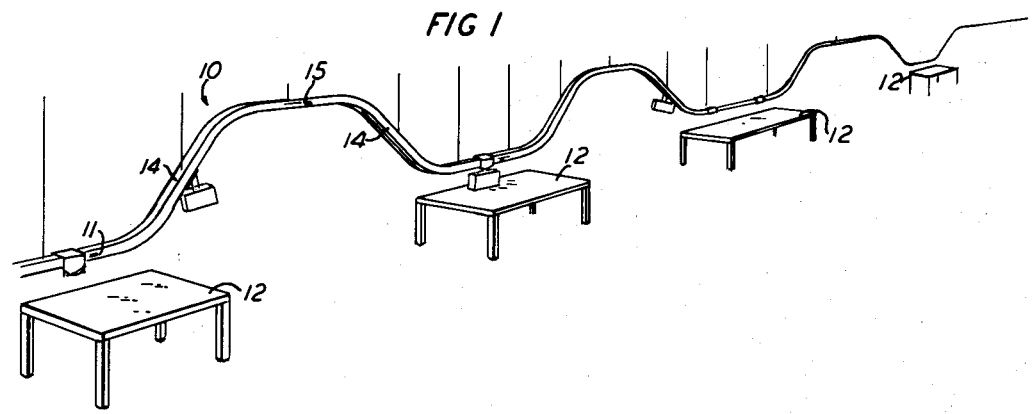
FIG 1
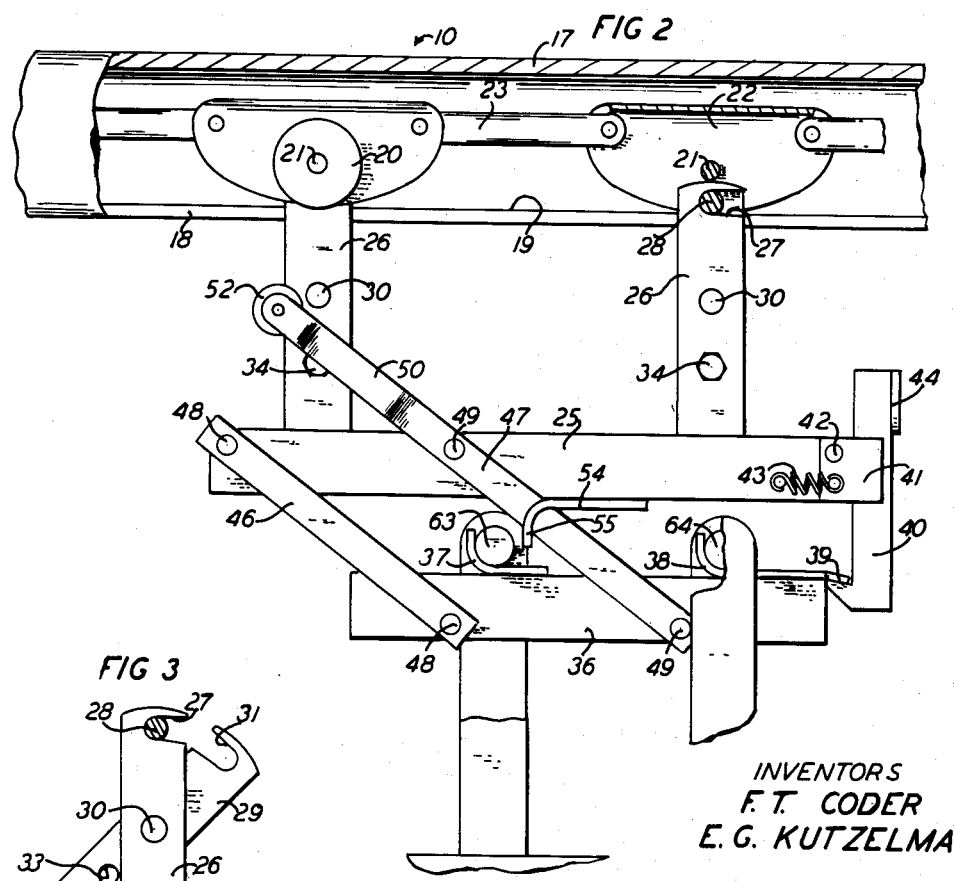
FIG 2
FIG 3
INVENTORS
F. T. CODER
E. G. KUTZELMAN
BY
ATTORNEY

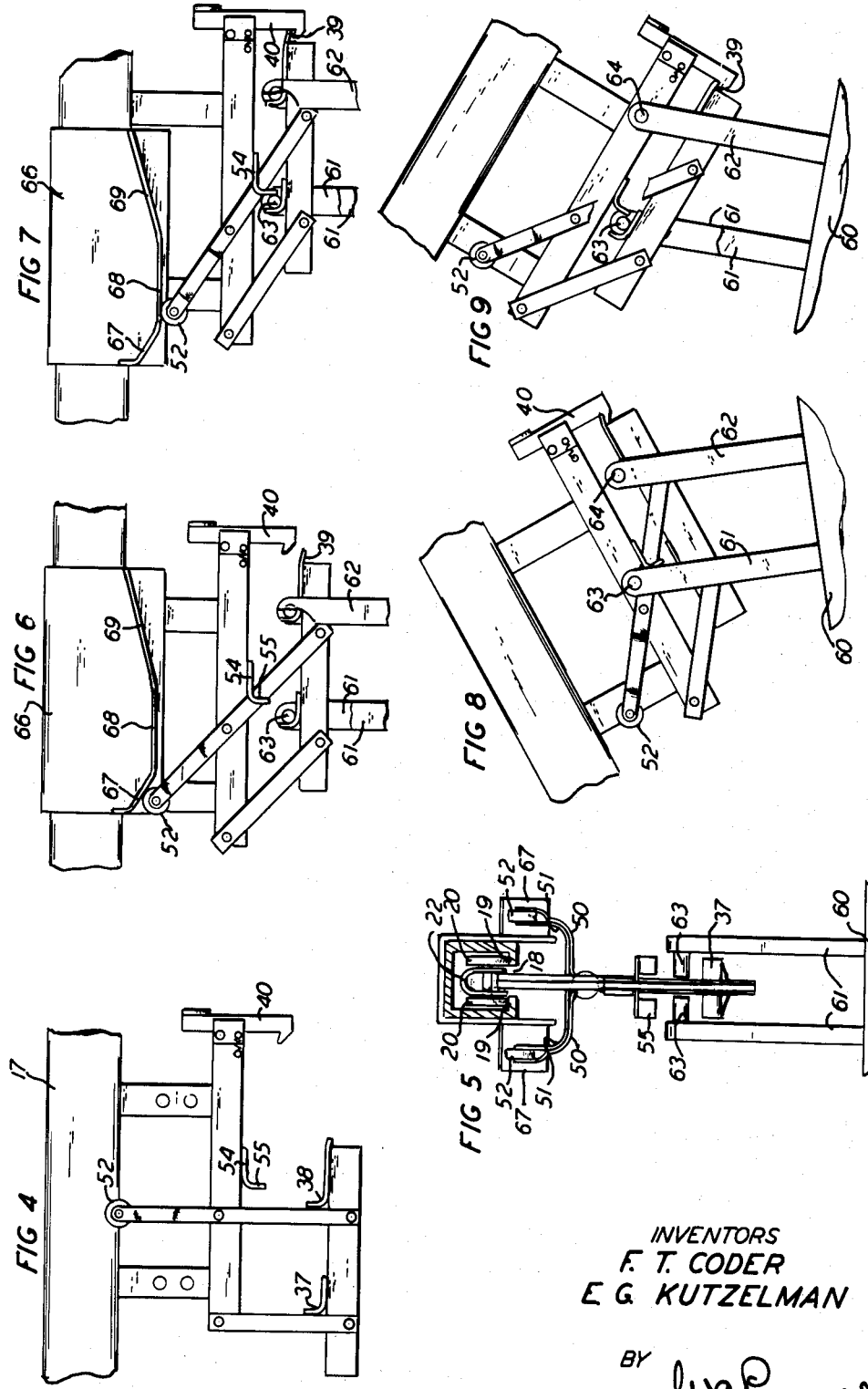

United States Patent Office 2,716,479
Patented Aug. 30, 1955

2,716,479

TRANSPORTING APPARATUS

Fred T. Coder, Groveland, Mass., and Elmer G. Kutzelman, Atkinson, N. H., assignors to Western Electric Company, Incorporated, New York, N. Y., a corporation of New York Application February 9, 1954, Serial No. 409,046

10 Claims. (Cl. 198—19)

This invention relates to apparatus for transporting articles and more particularly to apparatus adapted for attachment to overhead conveyors for transporting articles between predetermined locations.

A commercially known conveyor of the overhead type includes rollers carrying an endless chain movable in a channel type structure which may have numerous bends therein varying its contour so as to dip downwardly to positions adjacent benches or supports and to rise upwardly so that any articles carried by the conveyor may be moved safely over aisles between the benches or over machines and other objects in the general path of the conveyor. With a conventional belt-type conveyor, articles may be transported readily merely by placing the articles on the belt. This practice cannot be followed with an overhead conveyor, however, since the articles to be transported must be lifted from their supports, secured temporarily to the conveyor so that they may travel therewith and then lowered and deposited on the desired supports.

The object of the invention is an apparatus for transporting articles which provides a solution to these problems and which is substantially fully automatic in its action of receiving, transporting and releasing the articles.

With this and other objects in view, the invention comprises an apparatus for transporting articles, having projections, in combination with an overhead conveyor extending relative to supports for the articles, the apparatus comprising a frame adapted for attachment to the conveyor and supporting a lever pivotally mounted thereon and carrying a pocket adapted to receive the projection of the article so that through actuation of the lever the pocket may be caused to engage the projection of the article and raise it from the support so that it may be transported to any desired position along the path of the conveyor.

More specifically, the apparatus includes parallel levers pivotally connected at like spaced positions to the frame and to a member supporting pairs of pockets, one of the levers carrying a roller adapted to engage fixed position cams adjacent the supports so that an article having inwardly extending projections receivable in the pairs of pockets may be engaged and raised free of the support for transportation with the conveyor. A latch carried by the frame and normally urged in one direction automatically receives a forward portion of one of the pockets to hold the apparatus in its closed or raised positions for transportation of the article. The cams located adjacent the supports are adapted to actuate the levers to move the pocket free of the latch so that the operator at any support may allow the article to continue with the conveyor by leaving the latch in its present position or cause the apparatus to deposit the article at his support by moving the latch away from the path of the pocket allowing the cam to control the downward movement of the pockets with the article until the article comes to rest on the support, at which time, the pockets will be moved out of the path of the projections.

Other objects and advantages will be apparent from the following detailed description when considered in conjunction with the accompanying drawings, wherein:

Fig. 1 is a perspective view of an overhead conveyor illustrating a portion of its circuitous path relative to a plurality of supports;

Fig. 2 is a side elevational view of the apparatus shown attached to the conveyor;

Fig. 3 is a fragmentary detailed view of the attaching means shown in open position;

Fig. 4 is a side elevational view of the apparatus shown in open position;

Fig. 5 is an end elevational view of the apparatus showing a cross-sectional view of the conveyor with the apparatus about to receive an article;

Fig. 6 illustrates the apparatus after it has received the article and is moving it into closed position;

Fig. 7 is a side elevational view of the apparatus in closed position moving in a horizontal path;

Fig. 8 is a side elevational view of the apparatus illustrating the position of the article while the conveyor and apparatus are moving up an inclined path, and Fig. 9 is a side elevational view of the apparatus illustrating the position of the article while moving down an inclined path.

Referring now to the drawings, attention is first directed to Fig. 1 which illustrates a portion of a circuitous path of an overhead conveyor 10 showing the low positions 11 adjacent supports or benches 12 and the inclined portions 14 between the low positions 11 and high positions 15 extending over aisles between the supports or over other objects (not shown). The conveyor 10 includes a channel type housing 17 providing an opening 18 between tracks 19 on which pairs of rollers 20 ride (as shown in Fig. 5). The pairs of rollers 20 have their spindles 21 carried by links 22 which, in the present embodiment of the invention, are U-shaped in cross-section and joined by other links 23 to provide a flexible chain movable continuously through the housing or channel 17 and supported at closely adjacent positions by the pairs of rollers 20.

The apparatus includes a frame 25 having spaced vertical members 26 fixed thereto and provided with recesses 27 in their upper ends adapted to receive pins 28 carried by the links 22. Companion members 29 similar in contour to the members 26 are pivoted at 30 thereto and provided with recesses 31 extending in reverse directions so as to cooperate with the recesses 27 of the members 26 and close about the pins 28, providing positive yet pivotal connection between the endless chain of the conveyor and the frame 25 of the apparatus. The members 26 and 29 are provided with apertures 32 and 33 adapted for alignment when the members are in the closed positions (shown in Fig. 2) to receive bolts 34 to positively lock the members in their closed positions.

A member 36 parallel with the frame 25 has pockets 37 and 38 mounted thereon, the pocket 38 having a lip 39 extending beyond the forward end of the member 36 and disposed at an angle with respect thereto for interengagement with a latch 40. The latch 40 is fixed to a member 41 which is pivotally mounted at 42 on the end of the frame 25 and normally urged into the closed position shown by a spring 43. An upper portion 44 of the latch may be engaged by the operator to move the latch free of the pocket 38, or the portion 39 thereof, when the apparatus is adjacent one of the supports 12.

The member 36 is supported by pairs of link-like levers 46 and 47 disposed on each side of the frame 25 and member 26 and pivotally connected thereto at their respective positions 48 and 49. The lever 47 has upper portions which extend outwardly as shown at 50 in Fig. 5 where they are provided with a companion U-shaped member 51 which serves as a reinforcing means for the upper portions of the levers 47 and to also assist in rotatably supporting cam rollers 52. A bifurcated member 54 fixed to the undersurface of the frame 25 is adapted to straddle the levers 47 free of engagement therewith and to provide downwardly projecting portions 55 to cooperate with the pocket 37 as hereinafter described.

The article to be transported by the apparatus is in reality a holder 60 or frame-like structure for receiving and supporting various types of articles or electrical structures to be assembled or partially assembled at the various supports 12. The article 60 includes vertically extending pairs of arms 61 and 62 having inwardly extending projections 63 and 64 adapted to be received in the pockets 37 and 38 respectively of the apparatus. Each support 12 may be provided with a receiving and loading station (not shown) including any suitable locating means for the articles 60 to align them with the numerous apparatus as they travel with the conveyor to be picked up from one bench and conveyed to any of the other benches.

Considering now the operation of the apparatus, attention is directed to Figs. 4 and 5 which illustrate the apparatus in the open position traveling (for example) in one of the lower portions 11 of the conveyor approaching an article 60 to be received thereby. When in the open position, the pockets 37 and 38 are located below the projections 63 and 64. Furthermore, the frame 25 and the member 36 are sufficiently narrow, the same being true of the adjacent portions of the levers 46 and 47, to permit them to travel between the inner ends of the projections 63 and 64 as illustrated in Fig. 5.

The actuating means for the apparatus at each support includes a cam-like unit 66 formed to straddle the housing 17 of the conveyor and provide pairs of cam surfaces 67, 68 and 69 to be engaged by the cam rollers 52. The cam surfaces 67, when engaged by the cam rollers 52, will cause the levers to move from the position shown in Fig. 4 to the position shown in Fig. 6, where the pockets 37 and 38 are raised to engage the pairs of projections 63 and 64, and to further move the levers to the position shown in Fig. 7 where the forward projection 39 will actuate the latch into the position shown. In Fig. 7, the cam rollers 52 ride on the cam surface 68 holding the projection 39 a short distance above the supporting tongue of the latch 40 so that at any support, an operator may cause operation of the apparatus to lower the article on his particular support by holding the latch beyond the projection 39 until the cam rollers 52 engage and start their travel on the cam surface 69. At this time, the article will be lowered slowly during opening of the apparatus from the position shown in Fig. 7 to the position shown in Figs. 4 and 5 where the article will be located on the adjacent support and the pockets 37 and 38 will move below and out of the path of the projections 63 and 64.

It will be apparent, therefore, that the apparatus is capable of automatically receiving articles at any support, raising them into latched positions and transport them to any other support through an action which is completely automatic with the exception of the element of selection which rests with the person at any of the supports 12, requiring only a pressure on the latch 40 which has been relieved of the weight of the article by the cam surface 68 to condition the apparatus to lower the article at the selected stations.

Attention is now directed to Fig. 1 illustrating certain of the various paths through which the apparatus may travel in transporting articles successively from predetermined supports to other supports. An important feature of the apparatus is to eliminate, as much as possible, any undue strain on the conveyor and to maintain balanced suspension of the articles as they travel along the ever varying path of the conveyor. If it were possible for the conveyor to travel in a horizontal plane, this problem would not exist but the repeated up and down motions or inclined paths of the conveyor create tilting positions of the apparatus in following the chain of the conveyor. However, it will be noted by viewing Figs. 8 and 9, that regardless of whether the apparatus is tilted to move upwardly or to move downwardly, the article 60 will maintain a balanced position although it may shift slightly in doing so, depending whether or not it is supported by the projections 64 in the pocket 38 or the projections 63 in the pocket 37. It is during these movements of the apparatus that the retaining bifurcated member 54 forms its function as illustrated particularly in Fig. 9 to maintain the projections or pins 63 in the pocket 37.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for transporting articles having projections, in combination with an overhead conveyor extending relative to supports for the articles, the apparatus comprising a frame, means to secure the frame to the conveyor, a pocket adapted to receive the projection of an article, a lever pivotally connected at spaced positions to the frame and the pocket, and means to actuate the lever to cause the pocket to engage a projection of an article and raise it from its support.

2. An apparatus for transporting articles having projections, in combination with an overhead conveyor extending relative to supports for the articles, the apparatus comprising a frame means to secure the frame to the conveyor, a pocket adapted to receive the projection of an article, a lever pivotally connected at spaced positions to the frame and the pocket, means to actuate the lever to cause the pocket to engage a projection of an article and raise it from its support, and a latch independent of said lever adapted to hold the pocket in the raised position.

3. An apparatus for transporting articles having projections, in combination with an overhead conveyor extending relative to supports for the articles, the apparatus comprising a frame means to secure the frame to the conveyor, a pocket adapted to receive the projection of an article, a lever having one portion thereof pivotally mounted on the frame and another portion thereof supporting the pocket, and means to actuate the lever a given distance about its pivot to align the pocket with a projection of an article on a support and to actuate the lever a further distance about its pivot to raise the article from the support.

4. An apparatus for transporting articles having projections, in combination with an overhead conveyor extending relative to supports for the articles, the apparatus comprising a frame, means to secure the frame to the conveyor, a lever pivotally mounted on the frame, a pocket adapted to receive and support a projection of an article and thereby support the article, means to secure the pocket to the lever, and means to cause movement of the lever to lower the article onto a support while the projection remains in the pocket.

5. An apparatus for transporting articles having projections, in combination with an overhead conveyor extending relative to supports for the articles, the apparatus comprising a frame, means to secure the frame to the conveyor, a lever pivotally mounted on the frame, a pocket adapted to receive and support a projection of an article and thereby support the article, means to secure the pocket to the lever, and means to cause movement of the lever to first lower the pocket while supporting the article until the article rests on a support and then move the pocket free of the projection of the article.

6. An apparatus for transporting articles having projections, in combination with an overhead conveyor extending relative to supports for the articles, the apparatus comprising a frame, means to secure the frame to the conveyor, a lever pivotally mounted on the frame, a pocket adapted to receive and support a projection of an article and thereby support the article, means to secure the pocket to the lever, means disposed adjacent one support to actuate the lever to cause it to first align the pocket with the projection of the article and second to raise the article for transportation to a second support, and means disposed adjacent the second support to cause movement of the lever to lower the pocket with the article thereon until the article rests on the second support and move the pocket free of the projection.

7. An apparatus for transporting articles having projections, in combination with an overhead conveyor extending relative to supports for the articles, the apparatus comprising a frame, means to secure the frame to the conveyor, a lever pivotally mounted on the frame, a pocket adapted to receive and support a projection of an article and thereby support the article, means to secure the pocket to the lever, means disposed adjacent one support to actuate the lever to align the pocket with the projection of the article until the projection enters the pocket and then raise the pocket with the article for transportation to a second support, a releasable latch carried by the frame adapted to hold the pocket in the raised position, and means disposed adjacent the second support to cause movement of the lever first in one direction, to free the latch for movement away from the pocket, and then in the reverse direction to lower the article onto the second support.

8. An apparatus for transporting articles having spaced projections, in combination with an overhead conveyor movable through a guided path including low portions adjacent supports with intermediate high portions and diagonal connecting portions, the apparatus comprising a frame, means to secure the frame to the conveyor to cause it to follow the path of the conveyor, a member disposed parallel with the frame, and means to secure the member to the frame, open pockets mounted on the member at spaced positions corresponding to the spacing of the projections of each article to respectively receive the projections of an article and thereby support the article in balanced suspension.

9. An apparatus for transporting articles having spaced projections, in combination with an overhead conveyor movable through a guided path including low portions adjacent supports with intermediate high portions and diagonal connecting portions, the apparatus comprising a frame, means to secure the frame to the conveyor to cause it to follow the path of the conveyor, parallel levers pivotally carried by the frame pivotally connected to the member to support the member, open pockets mounted on the member at spaced positions corresponding to the spacing of the projections on an article and movable with the member free of the projections during a given distance in each low portion of the path of the conveyor, and means to actuate the levers to cause the pockets to receive the projections and thereby lift the article from the support.

10. An apparatus for transporting articles having spaced projections, in combination with an overhead conveyor movable through a guided path including low portions adjacent supports with intermediate high portions and diagonal connecting portions, the apparatus comprising a frame, means to secure the frame to the conveyor to cause it to follow the path of the conveyor, parallel levers pivotally carried by the frame pivotally connected to the member to support the member, open pockets mounted on the member at spaced positions corresponding to the spacing of the projections on an article and movable with the member free of the projections during a given distance in each low portion of the path of the conveyor, means to actuate the levers to cause the pockets to receive the projections and thereby lift the article from the support, and means carried by the frame to maintain one of the projections in its pocket during tilting of the frame and member in one direction.

References Cited in the file of this patent

UNITED STATES PATENTS 1,731,095     Draeger _____ Oct. 8, 1929